US006988511B2

(12) United States Patent
Tang

(10) Patent No.: US 6,988,511 B2

(45) Date of Patent: Jan. 24, 2006

(54) OUTLET VALVE STRUCTURE FOR WATER DISPENSER

(76) Inventor: Chang Kuei Tang, No. 14,Lane 54, Lungchiuan St., Banchiau City, Taipei (TW) 220

( * ) Notice: Subject to any disclaimer, the term of this patent is extended or adjusted under 35 U.S.C. 154(b) by 392 days.

(21) Appl. No.: 10/601,519

(22) Filed: Jun. 24, 2003

(65) Prior Publication Data

US 2004/0261865 A1 Dec. 30, 2004

(51) Int. Cl.
*F16K 49/00* (2006.01)

(52) U.S. Cl. .................. 137/625.29; 137/334; 251/297

(58) Field of Classification Search ................ 137/334, 137/339, 599.14, 625.14, 625.29, 625.3, 137/625.31; 251/297
See application file for complete search history.

(56) References Cited

U.S. PATENT DOCUMENTS

| | | | | | |
|---|---|---|---|---|---|
| 222,889 | A | * | 12/1879 | Gathright | 137/625.29 |
| 1,910,753 | A | * | 5/1933 | Colvin | 137/625.29 |
| 2,209,989 | A | * | 8/1940 | McCanna | 137/625.29 |
| 2,613,056 | A | * | 10/1952 | Hughes | 137/625.29 |
| 3,012,570 | A | * | 12/1961 | Gibiser | 137/334 |
| 3,012,571 | A | * | 12/1961 | Castillo | 137/334 |
| 4,629,096 | A | | 12/1986 | Schroer et al. | |
| 5,493,873 | A | | 2/1996 | Donselman et al. | |
| 5,676,278 | A | | 10/1997 | Beyer et al. | |
| 5,819,784 | A | * | 10/1998 | Yoon | 137/334 |
| 6,123,232 | A | | 9/2000 | Donselman et al. | |
| 6,354,344 | B1 | | 3/2002 | Pluta et al. | |

* cited by examiner

*Primary Examiner*—John Rivell

(57) ABSTRACT

A outlet valve structure of a water dispenser includes a body member, a first controller, a second controller and a control switch. The outlet valve has the function of controlling dispense and switch of hot water, cold water and warm water. Therefore, only one of such outlet valve is required for one water dispenser; and consequently, the front panel area of the water dispenser is reduced.

10 Claims, 8 Drawing Sheets

OUTLET VALVE STRUCTURE FOR WATER DISPENSER

BACKGROUND OF THE INVENTION

The present invention relates generally to an outlet valve structure for a water dispenser, and more particularly, to an outlet valve structure for controlling dispense of hot water, cold water and/or warm water.

FIG. 1 shows the structure of a conventional water dispenser. Recessed from the front panel of the water dispenser 1*a* is a space for disposing receptacles. On the top portion of the recessed space, three parallel outlet valves 11*a* are formed for controlling dispense of hot water, cold water and warm water, respectively. By disposing the receptacle underneath the selected outlet valve 11*a*, water at required temperature can be dispensed by operating the select outlet valve 11*a*.

The conventional water dispenser 1*a* comprises at least two outlet valves 11*a* to control dispense of hot water and cold water, respectively. When warm water is required, the user can mix hot water and the cold water with specific proportion, or an additional warm water outlet valve can also be formed. Either of the above methods requires a large front panel area and a large space for disposing the receptacles to receive water at various temperatures.

Therefore, there is a substantial need to provide a water dispenser that can dispense hot water, cold water and warm water with a reduced front panel area and space for disposing receptacle for receiving water.

BRIEF SUMMARY OF THE INVENTION

The present invention provides a single outlet valve of a water dispenser that can provide hot, cold and warm water, such that the front panel area and volume for disposing receptacle can be reduced.

The outlet valve provided by the present invention comprises a hollow body member, a first controller, a second controller and a control switch. The body member has an inlet port, a water supply port, a first outlet port and a second outlet port on a bottom surface at a first end thereof. The second end of the body member is open to receive the first and second control member within the space. The first control member fixed within the space comprises an inlet port, a water supply port, a first outlet port distal to the inlet port and a second outlet port in proximity of the second outlet port. The first outlet port is connected to the water supply port by a channel. The inlet, water supply, first and second outlet ports of the body member are aligned with the inlet, water supply, first and second outlet ports of the first control member, respectively. The second control member is superposed on the first control member. The second control member comprises a slot and a water block extending into the slot. Under the normal closed status, the inlet port of the first control member is aligned with and blocked by the water block, and the water supply port of the first control member is connected to the slot of the second control member. Between the first and second outlet ports of the second control member, a third outlet port is formed. The switch member covers the open end of the body member and linked with the second control member. By operating the switch member, the second control member is moved relative to the first control member.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
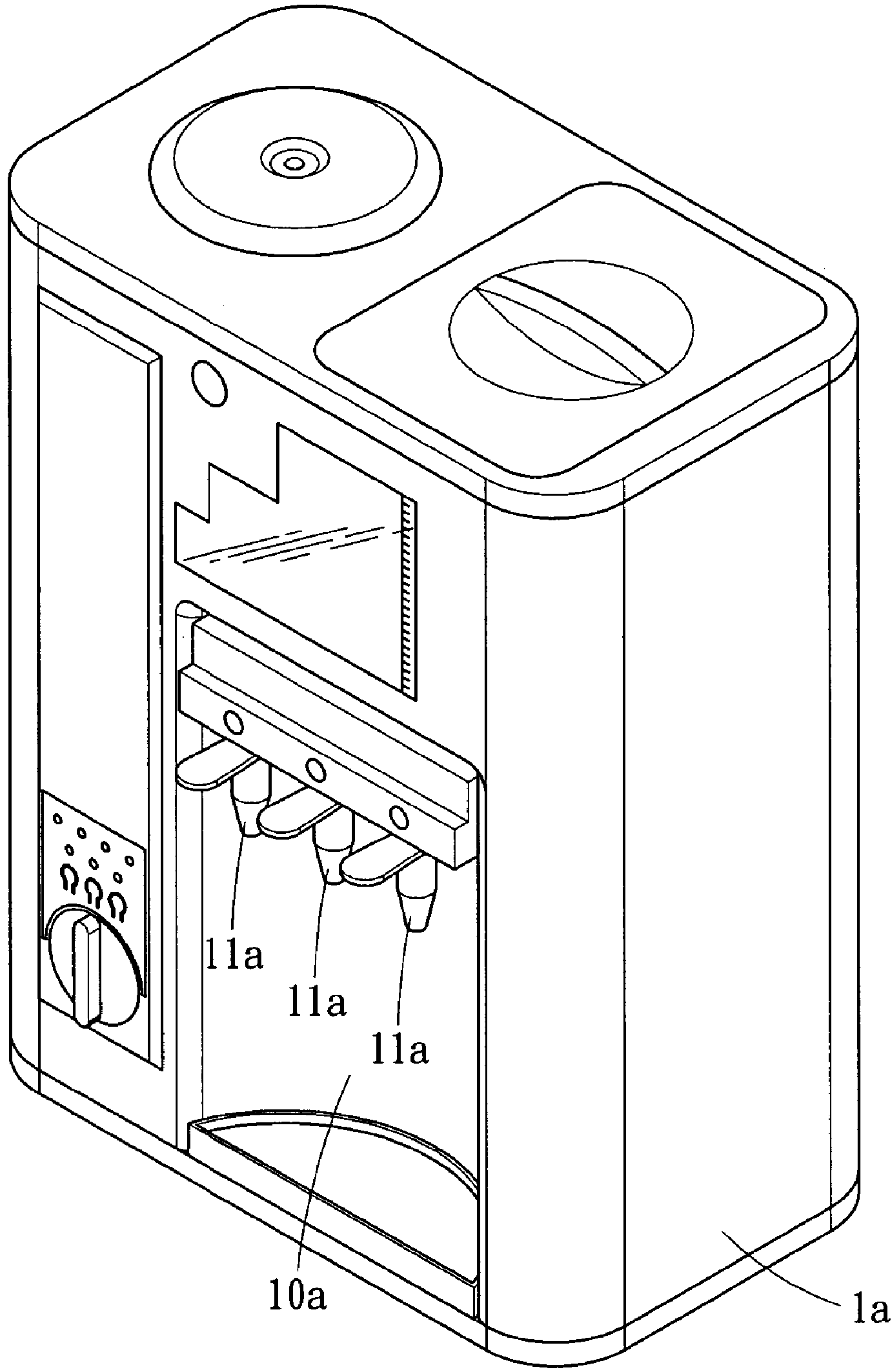
FIG. 1 shows a perspective view of a conventional water dispenser.
Figure 2:
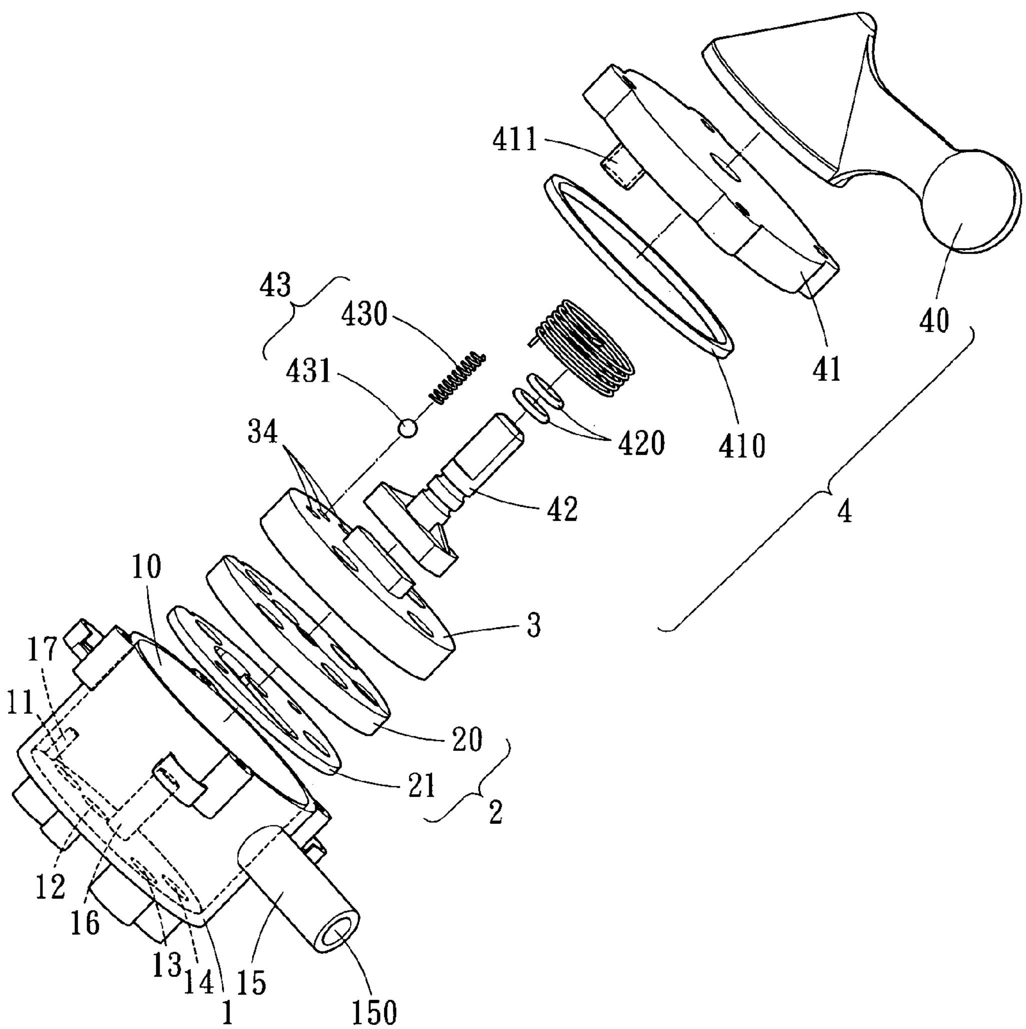
FIG. 2 shows an exploded view of a water dispenser provided by the present invention.
Figure 3:
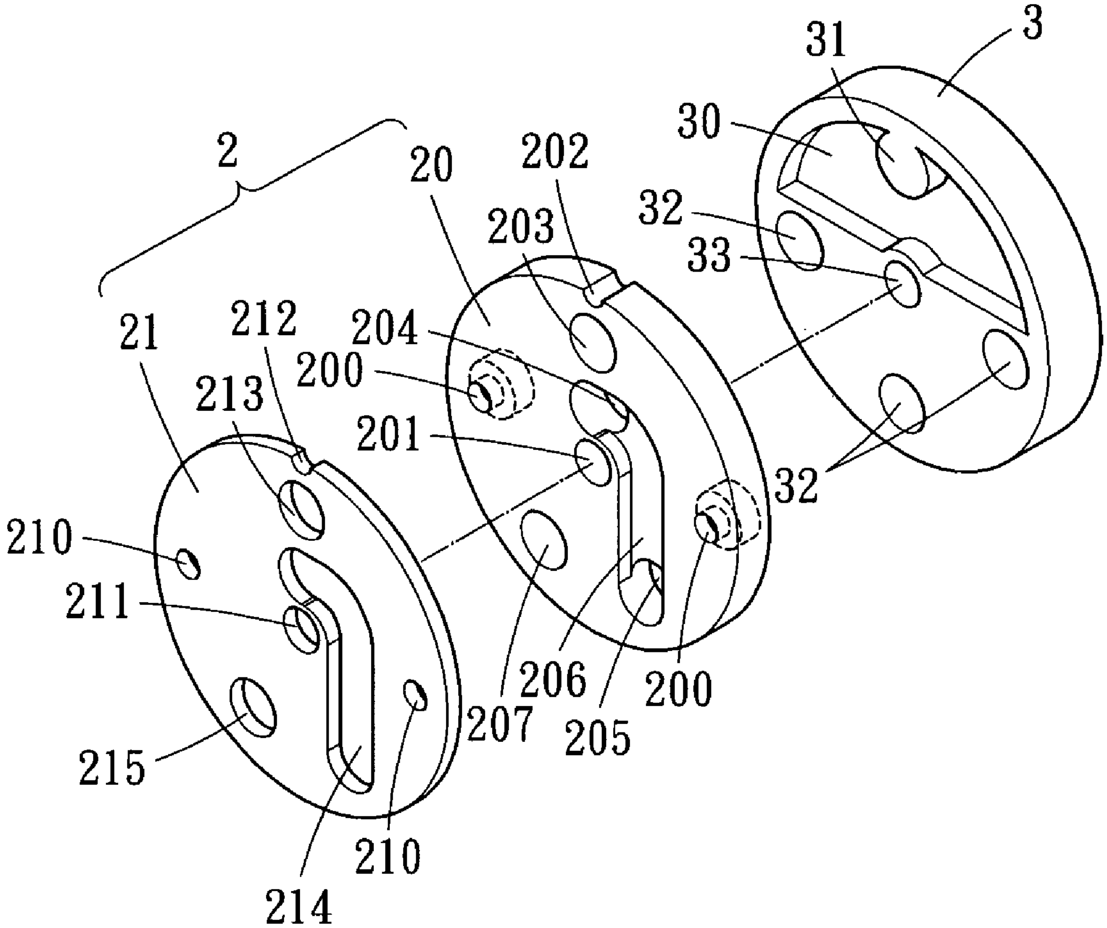
FIG. 3 shows an exploded view of the water dispenser from a different viewing angle.
Figure 10:
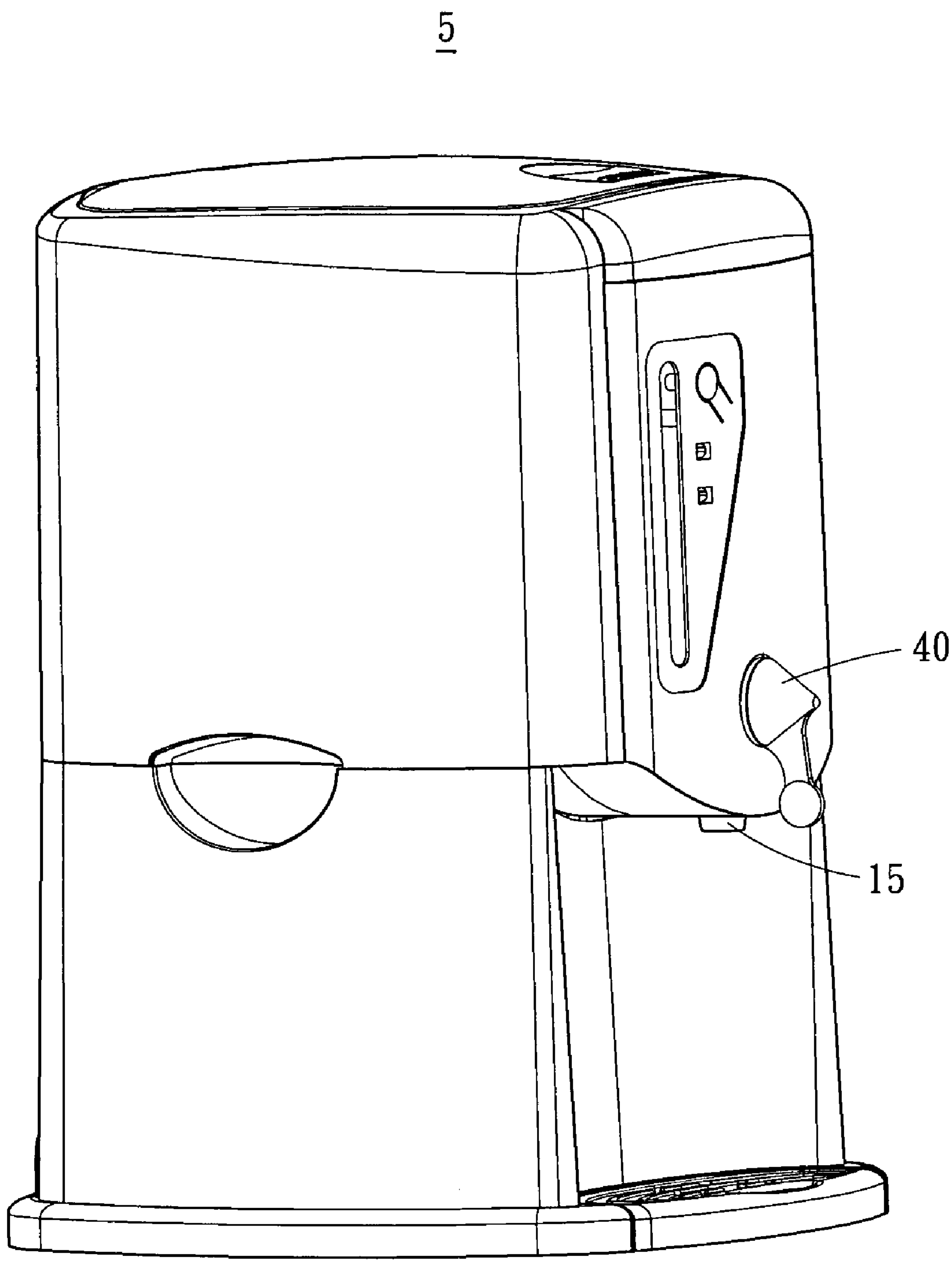
FIG. 10 shows a perspective view of the water dispenser.

FIGS. 2, 3 and 10 show the exploded views of the first and second controllers from different viewing angles. The present invention provides an outlet valve used to control dispense and switch of hot water, cold water and warm water. The outlet valve includes a body member 1, a first control member 2, a second control member 3 and a control switch 4.

The body member 1 is the bulk of the outlet valve. The body member 1 is hollow and defines a space 10 therein. On one side of the body member 1, a water inlet port 11, a water supply port 12, a first outlet port 13 and a second outlet port 14 are formed on a bottom surface. A tube 15 extends from a sidewall of the body member 1 with one end in fluid communication with the space 10 of the body member 1 and the other end used as a water outlet 150. The other side of the body member 1 is open for receiving the first control member 2, the second control member 3 and the control switch 4 therein.

The first control member 2 is installed in the space 10 of the body member 1. The first control member 2 includes an upper body 20 and a lower body 21 attached to each other. The lower body 21 is in contact with the bottom surface and preferably made from material such as silicone. The upper and lower bodies 20 and 21 include connecting perforations 200, 210 (as shown in FIG. 3) aligned with each other to allow fastening elements such as screws fastening the upper and lower bodies 20 and 21 into an integral body of the first control member 2.

Axial perforations 201, 211 are formed through the centers of the upper body 21 and the lower body 22, respectively. At the bottom surface of the body member 1, an axial pole 16 is mounted for perforating through the upper body 21 and the lower body 22 at the axial perforations 201 and 211. On the periphery of the upper and lower bodies 20 and 21, notches 202 and 212 are formed, and corresponding to the notches 202 and 212, a protrusion 17 is formed on the body member 1. Therefore, the engagement of the protrusion 17 and the notches 202 and 212 allows the first control member 2 to be fixed in the body member 1 to avoid a relative rotation between the first control member 2 and the body member 1.

Water inlets ports 203 and 213 are formed on the upper and lower bodies 20 and 21, respectively. On the upper body 20, a water supply port 204 is formed at proximity of the water inlet port 203, and a first outlet port 205 is formed distal to the water inlet 203. A through trench 206 connecting the water supply port 204 and the first outlet port 205 is formed on the upper body 20. Similarly, a through trench 214 is formed on the lower body 21 and aligned with the slot 206. Therefore, when the upper and lower bodies 20 and 21 are attached other, the trenches 206 and 214 define a channel allowing water to flow through. Second outlet ports 207 and 215 are formed on the upper and lower bodies 20 and 21 at positions distal to the inlet ports 203 and 213, respectively. The water inlet port 11, the water supply port 12, the first outlet port 13 and the second outlet port 14 of the body member 1 are connected to the water inlet ports 203, 213, the water supply port 204, and the first and second outlet ports 205, 207 and 215, respectively.

The second control member 3 is movably/rotatably mounted in the space 10 of the body member 1 superposing the first control member 2. The second control member 3 includes a slot 30 and a water block 31 protruding into the slot 30. Under the normally close condition of the water outlet valve, the water block 31 is aligned with the water inlet port 203 of the first control member 2 to seal the water inlet 203. Meanwhile, the water supply port 204 of the first control member 2 is also aligned with the slot 30 and in fluid communication therewith.

The second control member 3 comprises at least a third outlet port 32 in addition to the slot 30. The third outlet port 32 is aligned with the portion between the first and second outlet ports 205 and 207 of the upper body 20 of the first control member 2. In one embodiment of the present invention, three third outlet ports 32 are formed on the second control member 3 staggered with the first and second outlet ports 205 and 207 of the first control member 2.

Preferably, the second control member 3 includes a circular plate with a center thereof perforated with an axial perforation 33. Similar to the axial perforations 201 and 211, the axial pole 16 penetrates through the second control member 3 at the axial perforation 33. In this embodiment, the contour of the space 10 of the body member 1 is conformal to the periphery of the second control member 3, such that the second control member 3 can freely rotate relative to the first control member 2 within the space 10.

The control switch 4 is mounted at the other side of the body member 1 and linked with the second control member 3. By controlling the control switch 4, the relative rotation between the first and second control members 2 and 3 is generated. In this embodiment, the control switch includes a control handle 40, a lid 41 covering the other side of the body member 1, and a shaft 42 connecting the lid 41 and the control handle 40 to the second control member 3. By moving the control handle 40, the second control member 3 is rotated relative to the first control member. To ensure the body member 1 and the lid 41 being closely engaged to avoid water leaking into the body member 1, a sealing ring 410 is installed between the lid 41 and the body, and a sealing ring 420 can be installed between the shaft 42 and the lid 41.

While moving the control hand 41 of the control switch 4, a positioning effect is also obtained by forming a positioning recess 34 on the second control member 3, a positioning column 411 extending from the lid 41, and an elastic positioning bead 43 in the positioning column 411. The positioning bead 43 is retained in the positioning recess 34 by exerting a force thereto. Alternatively, the elastic positioning bead 43 comprises a positioning bead 431 and a spring 430 within the positioning column 411.

Figure 4:
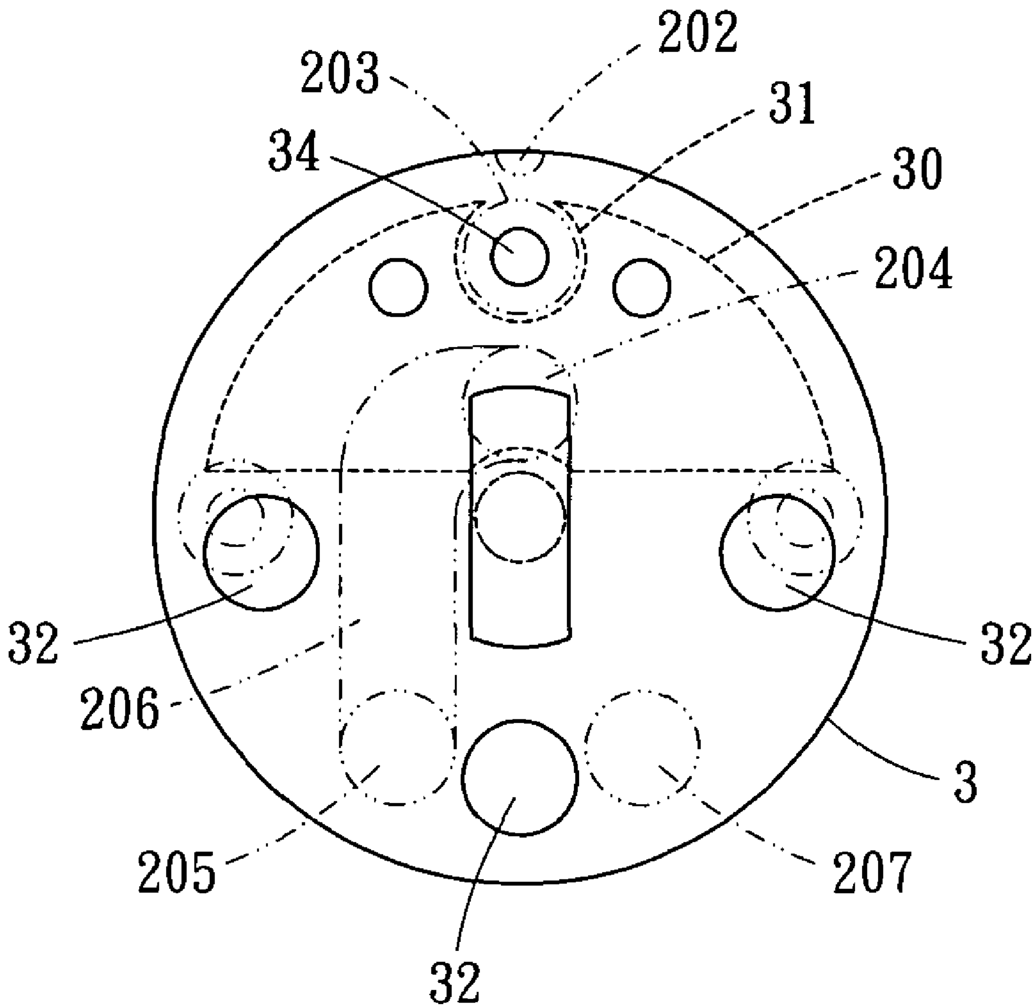
FIG. 4 shows the planar schematics of the first and second controllers under off condition.
Figure 9:
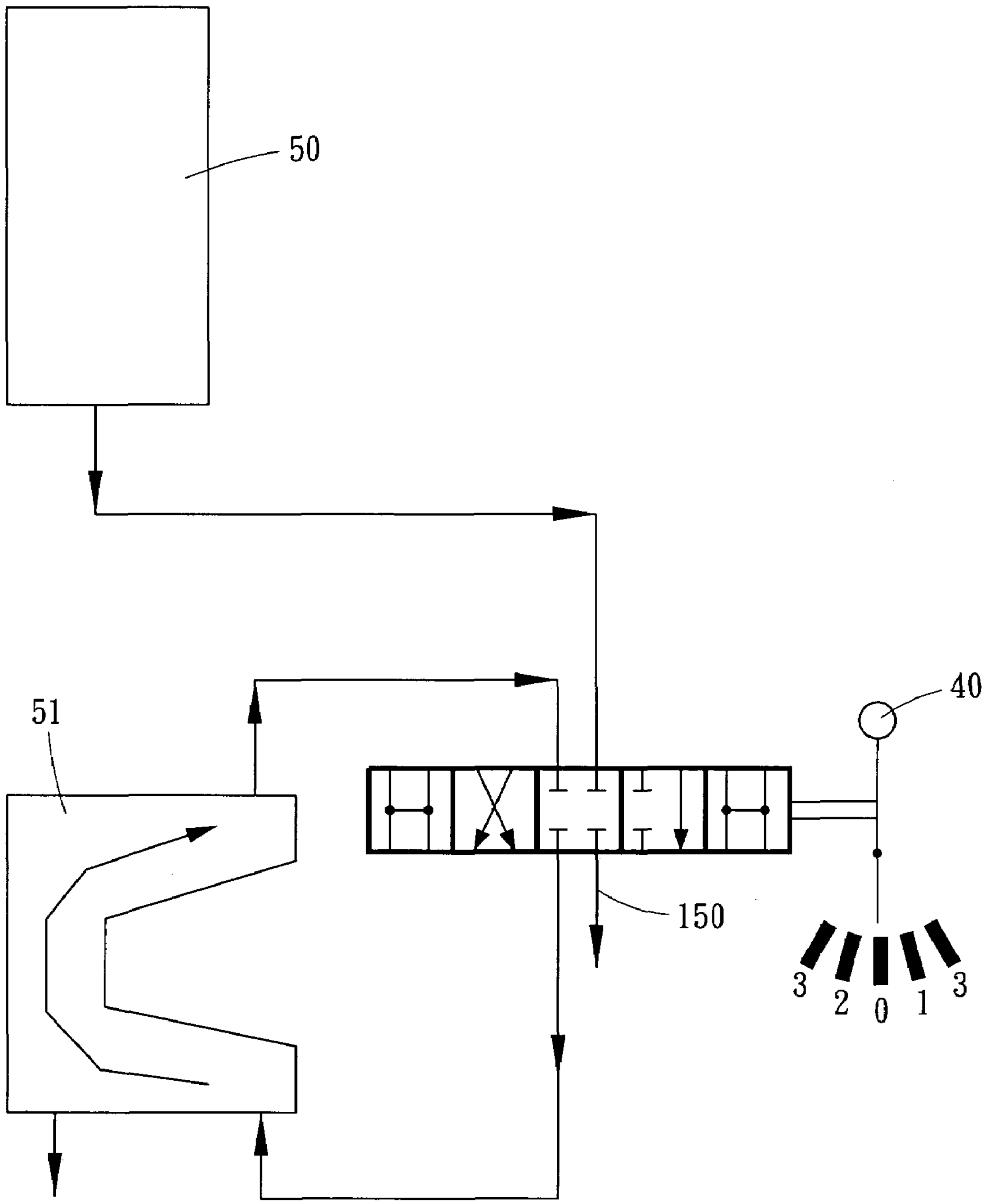
FIG. 9 shows a block diagram of the water dispenser.

As shown in FIGS. 3, 4 and 9, under the normally closed condition of the water valve, the control handle 40 pointing at "0" as shown in FIG. 9. The water canister 50 disposed within the water dispenser 5 is connected to the water inlet port 11 of the body member 1 via tubing. Thereby, hot water is led to the inlet ports 203, 213 of the first and second control members 2 and 3, However, as the inlet port 213 of the second control member 2 is blocked by the water block 31, hot water cannot flow through, and the water outlet valve is off.

Figure 5:
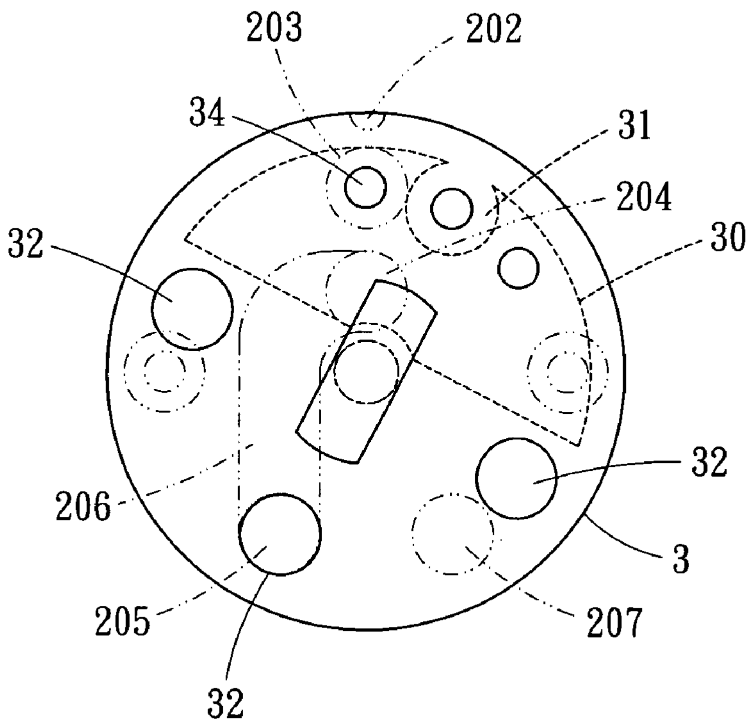
FIG. 5 shows the planar schematics of the first and second controllers when hot water is dispensed.

As shown in FIGS. 3, 5 and 9, when the control handle 40 is turned to point at "1" (FIG. 9), the second control member 3 is driven by the control hand 40 to rotate, such that the water block 31 is displaced from the inlet port 203 of the second control member 3. Hot water can now flow in the slot 30. Meanwhile, as one of the third outlet ports 32 is connected to the first outlet port 205 of the first control member 2, and the water supply port 204 of the first control member 2 is connected to the slot 30 for supplying hot water. Hot water flows from the channel defined by the slots 206 and 214 to the first outlet port 205, and exits from the third outlet port 32 of the second control member 3. Thereby, hot water is accumulated downwardly and dispensed from the outlet port 150 of the body member.

Figure 6:
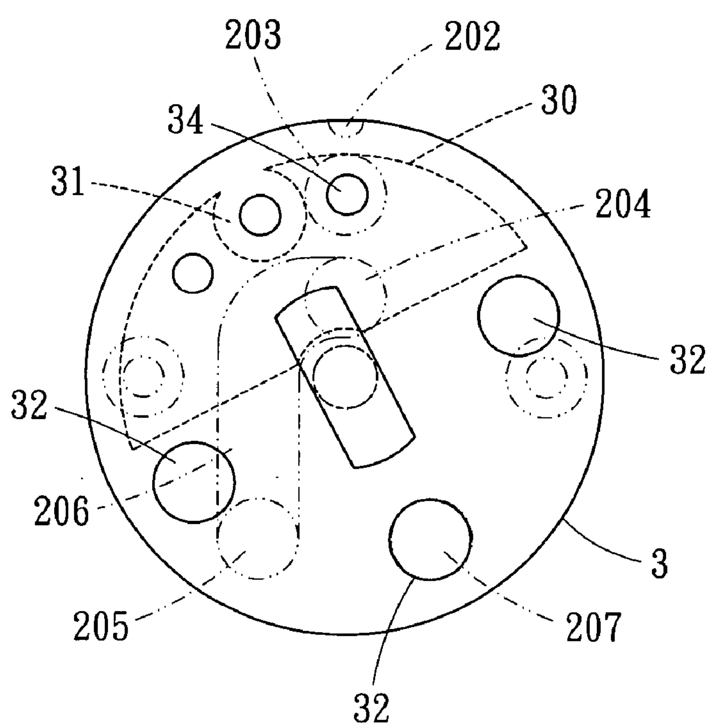
FIG. 6 shows the planar schematics of the first and second controllers when cold water is dispensed.

As shown in FIGS. 3, 6 and 9, when the control handle 40 is turned to point at "2" (FIG. 9), the second control member 3 rotates to displace the water block 31 from the inlet port 203. Therefore, hot water is allowed to flow into through the channel defined by the trenches 206 and 214. However, the rotation of the second control member 3 resulted one of the third outlet port 32 being aligned with the second outlet ports 207 and 215 of the first control member 2. Therefore, hot water cannot flow through the first outlet port 205 and can only be accumulated towards the first outlet port 13 of the body member 13. The first outlet port 13 is connected with the cold water canister 51 within the water dispenser 5 by tubing, such that hot water flows into the cold water canister 51 to be cooled down. Preferably, to obtain an optimal cooling effect, the cold water canister 51 has an opening at a sidewall thereof allowing hot water to flow through. The top of the cold water canister 51 is connected to the second outlet port 14 of the body member 1 via tubing, such that while being is rushed out of the cold water canister 51 by hot water, the cold water flows from the second outlet port 14, through the second outlet ports 207, 215, and exit from the third outlet port 32 of the second control member 3. Thereby, cold water is accumulated downwardly to be dispensed from the outlet port 150.

Figure 7:
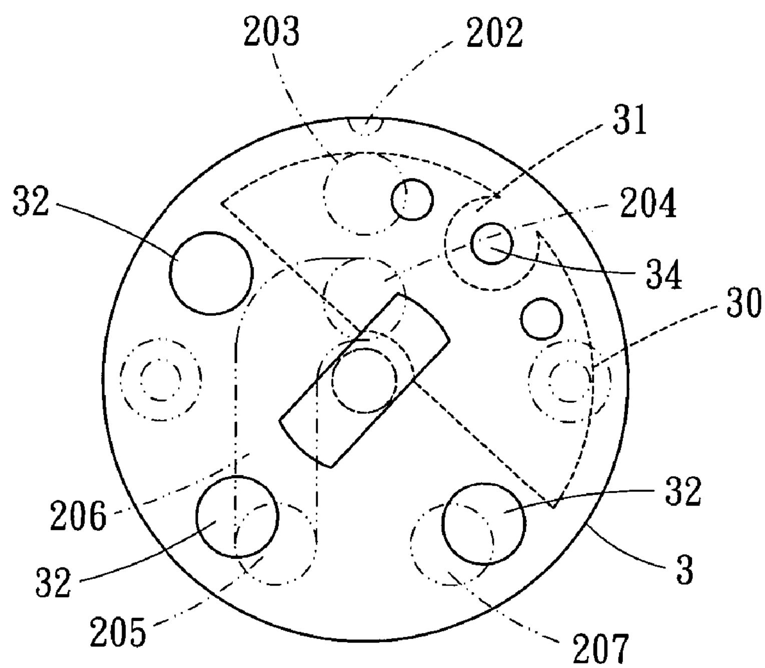
FIG. 7 shows the planar schematics of the first and second controllers when warm water is dispensed.
Figure 8:
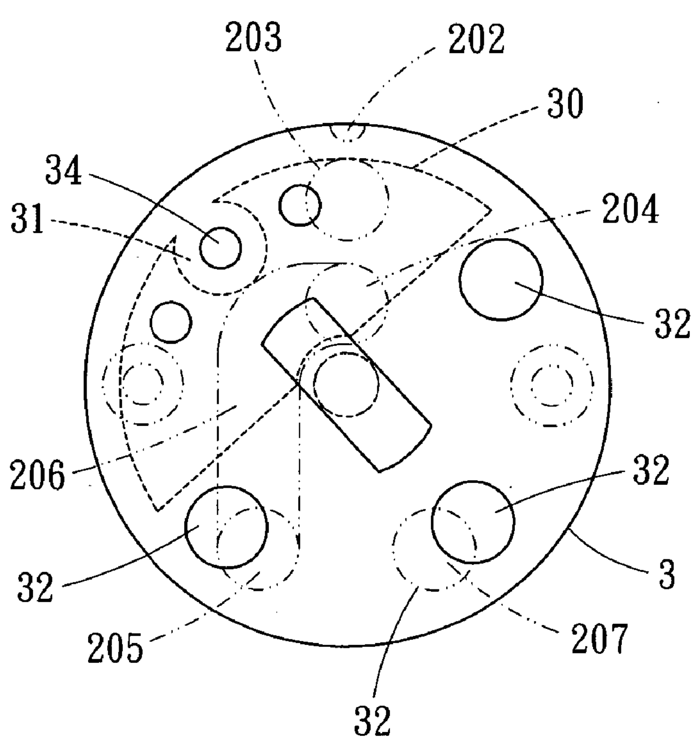
FIG. 8 shows another planar schematics of the first and second controllers when warm is dispensed.

As shown in FIGS. 3, 7, 8 and 9, when the control handle 40 is pointing at "3" (FIG. 3), hot water is allowed to flow into the slot 30. Meanwhile, according to the displacement of the second control member 3, the first and second outlet ports 205 and 217 are partly open to dispense both hot water and cold water simultaneously. Therefore, warm water mixed by cold and hot water can be dispensed from the outlet port 150. More specifically, when the second control member 3 is displaced as shown in FIG. 7 or FIG. 8, one of the third outlet ports 32 is partially aligned with the first inlet port 205 or the second inlet port 207, while one of the other third outlet ports 32 at two sides is partially aligned with the second outlet port 207 (FIG. 7) or the first outlet port (FIG.

8). Either condition will results in the above arrangement to dispense warm water from the outlet port 150.

According to the above, the present invention provides an outlet valve of a water dispenser. Only one of such outlet valve is used to provide supply of hot, cold and warm water as desired. Therefore, the front panel area and space for accommodating water container are greatly reduced. Further, one can obtain warm water directly without the effort of mixing hot and cold water.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An outlet valve of a water dispenser, comprising:

a hollow body member, including a first end terminated with a bottom surface and an open second end, the bottom surface including an inlet port, a water supply port, a first outlet port and a second outlet port;

a first control member, fixed within the body member, including an inlet port, a water supply port, a first outlet port distal to the inlet port, and a second outlet port in proximity of the inlet port, wherein the first outlet port is connected to the water supply port by a channel, such that the inlet port, the water supply port, the first and second outlet ports of the body member are connected to the inlet port, the water supply port, the first and second outlet port of the first control member, respectively;

a second control member, disposed within the body member and superposing the first control member, including a slot and a water block extending into the slot and aligned with the inlet port of the first control member under a normally closed condition, wherein the water supply port of the first control member is connected to the slot, and at least one third outlet port is formed on the second control member at a position between the first and second outlet ports of the first control member; and a control switch covering the second open end of the body member and linked with the second control member, the control switch being operative to drive the second control member to rotate in relation with the first control member.

2. The outlet valve of claim 1, wherein the body member includes an axial pole extending from the bottom surface towards a hollow space thereof, and each of the first and second control members comprises an axial perforation allowing the axial pole to penetrate through.

3. The outlet valve of claim 2, wherein the second control member has a circular periphery and the body member has an interior contour conformal to the periphery of the second control member.

4. The outlet valve of claim 1, wherein the first and second control members each includes a notch at a periphery thereof, and the body member includes a protrusion extending from a sidewall thereof to engage with the notch.

5. The outlet valve of claim 1, wherein the first control member further comprises an upper body and a lower body closely attached to each other.

6. The outlet valve of claim 5, wherein upper and lower bodies each comprises at least a perforation allowing a fastener to fasten the upper and lower bodies into an integral body.

7. The outlet valve of claim 1, wherein the second control member further comprises two third outlet ports staggered with the first and second outlet ports of the first and first control members.

8. The outlet valve of claim 1, wherein the control switch comprises a control handle, a lid covering the open end of the body member, and a shaft connecting the control handle, the lid and the second control member.

9. The outlet valve of claim 8, further comprising a sealing ring disposed between the lid and the body member.

10. The outlet valve of claim 8, further comprising a plurality of positioning members located between the second control member and the switch member, wherein each positioning portion comprises a hollow position column extending from the lid, a positioning recess on the second control member, and an elastic bead retained between the positioning portion and positioning column.

* * * * *